United States Patent
Backes et al.

(10) Patent No.: US 10,258,061 B2
(45) Date of Patent: Apr. 16, 2019

(54) METHOD AND DEVICE FOR PRODUCING STRIP-SHAPED OBJECTS, IN PARTICULAR STICKS OF CHEWING GUM

(71) Applicant: LOESCH Verpackungstechnik GmbH, Altendorf (DE)

(72) Inventors: Alexander Backes, Oberasbach (DE); Andreas Behrens, Bamberg (DE)

(73) Assignee: LOESCH VERPACKUNGSTECHNIK GMBH, Altendorf (DE)

( * ) Notice: Subject to any disclaimer, the term of this patent is extended or adjusted under 35 U.S.C. 154(b) by 593 days.

(21) Appl. No.: 14/439,217

(22) PCT Filed: Oct. 30, 2012

(86) PCT No.: PCT/EP2012/071474
§ 371 (c)(1),
(2) Date: Apr. 28, 2015

(87) PCT Pub. No.: WO2014/067559
PCT Pub. Date: May 8, 2014

(65) Prior Publication Data
US 2015/0245633 A1  Sep. 3, 2015

(51) Int. Cl.
| | |
|---|---|
| *B65H 35/10* | (2006.01) |
| *A23G 4/18* | (2006.01) |
| *A23G 4/02* | (2006.01) |
| *A23G 4/04* | (2006.01) |

(52) U.S. Cl.
CPC .................. *A23G 4/18* (2013.01); *A23G 4/02* (2013.01); *A23G 4/04* (2013.01); *B65H 35/10* (2013.01)

(58) Field of Classification Search
CPC .................................. A23G 4/04; B65H 35/10
USPC ........................................................ 225/100
See application file for complete search history.

(56) References Cited

U.S. PATENT DOCUMENTS

| | | | | |
|---|---|---|---|---|
| 2,843,061 A | * | 7/1958 | Bonebrake | ........... A23G 3/0236 225/100 |
| 3,106,118 A | * | 10/1963 | Schoppee | ............... B65B 35/54 198/572 |
| 3,933,064 A | | 1/1976 | Schoppee | |
| 4,023,723 A | | 5/1977 | Dammig | |

(Continued)

FOREIGN PATENT DOCUMENTS

| | | |
|---|---|---|
| DE | 102010022629 | 12/2010 |
| WO | WO/1999/015027 A1 | 4/1999 |

*Primary Examiner* — Kenneth E Peterson
(74) *Attorney, Agent, or Firm* — Cislo & Thomas, LLP (57) ABSTRACT

A method and device for producing individual strip-shaped objects. The method and device supply substantially rectangular sheets from which strip-shaped objects are to be formed. In forming the individual strips, the method and device separate an individual strip from the sheet along a front most groove, which forms a predetermined spacing between the individual consecutive separated strips for a subsequent onward conveying of the formed strips. Next, the method and device detect an actual position of each individually separated strip during the separation of the strips from the sheet, and corrects the position of the individual separated strips if the detected actual position of the strip does not correspond to a position which matches the predetermined spacing between the individual consecutive strips.

14 Claims, 3 Drawing Sheets

(56) References Cited

U.S. PATENT DOCUMENTS

| | | | |
|---|---|---|---|
| 5,309,697 A | 5/1994 | Hammacher et al. | |
| 9,840,345 B2 * | 12/2017 | Hammacher | B65B 5/06 |
| 2003/0019728 A1 * | 1/2003 | Kitagawa | B65B 35/243 |
| | | | 198/604 |
| 2010/0307106 A1 * | 12/2010 | Carrara | B65B 11/32 |
| | | | 53/209 |

* cited by examiner

METHOD AND DEVICE FOR PRODUCING STRIP-SHAPED OBJECTS, IN PARTICULAR STICKS OF CHEWING GUM

The invention relates to a method and a device for producing individual strip-shaped objects, in particular suitable for consumption, in particular sticks of chewing guns.

The method according to the invention and the device according to the invention for producing strip-shaped objects are, for example, components of a method and a device for packaging the produced strip-shaped objects. The strip-shaped objects can be, for example, sticks of chewing gum. In this case, in this connection the devices for packaging the produced strip-shaped objects are chewing gum packaging machines.

Methods and devices for producing strip-shaped objects, in particular sticks of chewing gum or chewing gum strips, as well as methods and devices for packaging such types of strip-shaped objects are known in the prior art, in particular chewing gum packaging machines. A method and a device for producing and for packaging individual strip-shaped objects, in particular sticks of chewing gum, is described, for example, in patent application PCT/EP2012/057145 by the applicant. Reference is made to this patent application concerning the basic principles of the present invention.

Insofar as chewing gums or sticks of chewing gum or chewing gum strips are mentioned below, this is to be understood purely as an example. Along with chewing gums, the present invention relates to any type of strip-shaped objects which, on the one hand, are suitable for human consumption (e.g. pastry or confectionery products) or which, on the other hand, are not intended for consumption (e.g. medical or pharmaceutical products).

In the case of the methods and devices known from the above-mentioned patent application and in the case of other known methods and devices for producing strip-shaped objects, first of all larger, substantially rectangular sheets are usually provided, from which the strip-shaped objects are to be formed. In this case, the length of the shorter sides of the rectangular sheets corresponds substantially to the length of one individual object of the strip-shaped objects to be formed. The sheets provided typically comprise several grooves which extend parallel to one another and substantially parallel to the shorter sides of the rectangular sheets and are arranged at identical spacings from one another, the spacing between two adjacent grooves in each case corresponding substantially to the width of the strip to be formed. The individual strips are then typically separated from the provided rectangular sheet one after another along said grooves. The grooves, in this case, provide tear lines in the material of the sheet which facilitate the separating of the individual strip by said strip being broken or torn, for example, from the sheet at the groove.

In the case of known chewing gum packaging machines and the devices for producing the individual sticks of chewing gum included therein, the larger rectangular product sheets (so-called slabs) are supplied by means of suitable conveying devices to a separating device or separating station, in which the individual product strips (sticks of chewing gum, e.g. so-called tab gum or stick gum) being formed from the sheet by the product strips being separated from the supplied sheet successively and continuously by suitable separating devices.

The sheet conveying devices are typically continuously running chain or belt conveyors, with or without entrainment means. The sheets are supplied by said conveying devices individually one after another in their longitudinal direction to the separating station. During the course of said conveying, the individual rectangular sheets in each case contact a preceding sheet by each sheet, by way of its front short side, for example knocking against the preceding sheet or joining up with said preceding sheet such that the individual consecutive sheets are located one behind another in a gap-free-manner and preferably in a positive locking and positionally precise manner in their longitudinal direction and are supplied in this manner from the conveying devices to the separating device. In the separating device, the individual product strips are separated in each case from the frontmost sheet at their front narrow end.

The essential point in this connection is that the product sheets are conveyed in their longitudinal direction consecutively in a substantially seamless manner, that there is therefore no gap between them so that in the following separating device the individual product strips can be formed continuously and uniformly with a substantially constant width and spaced apart from one another at a substantially constant spacing and then, in a corresponding manner, can be continuously conveyed onward in order then to for packaged, for example individually and/or in groups. However, should a gap appear between the consecutive sheets prior to or during the supplying thereof to the separating station, or in order to avoid the forming of such gaps during the course of the supplying of the sheets, suitable measures must be taken or devices provided which cause such gaps between the sheets to be closed or avoided. These types of measures are described, for example, in the above-mentioned patent application by the applicant. Further measures and devices of this type are described below in conjunction with the present invention.

The named patent application further describes an embodiment of a separating station for separating the individual strips from the supplied sheets. Accordingly, the separating devices include several consecutive conveying devices which grasp the supplied sheets and the individual strips formed therefrom and convey them onward. In this case, the conveying speeds of the individual consecutive conveying devices increase substantially in the conveying direction in order to generate a spacing between the individual formed strips which is necessary for the subsequent onward conveying of the strips.

In the case of said known separating device, several rotatable roller pairs which are arranged parallel to one another are arranged one behind another in the conveying direction, the rotational or conveying speed of the consecutive roller pairs increasing in the conveying direction. In the case of said embodiment, the first roller pair in the conveying direction grasps the supplied sheet and pulls it further, and the following roller pairs, as a result of the increase in speed compared to the first roller pair, separate the strip from the sheet. On account of the higher conveying speed of the following roller pairs in each case, a spacing is finally formed between the individual separated strips.

In the case of said embodiment, the consecutive roller pairs typically have a common drive in the machine such that the rotational or conveying speeds of the rollers, on the one hand, always remain substantially constant and, on the other hand, are not able to be modified relative to one another between the individual roller pairs. In particular, the rotational or conveying speeds of the individual roller pairs, in this connection, are not controllable or adjustable individually and independently of one another.

In the case of the known separating device, a star-shaped conveying device (separating star), which rotates about a rotational axis that is arranged parallel to the rotational axes of the roller pairs, is provided additionally in the conveying direction downstream of the several consecutive roller pairs. The star-shaped conveying device grasps the product strip that has been separated from the sheet by the roller pairs and accelerates said strip onward in the conveying direction in order to form a predefined, standard spacing between the individual consecutive product strips. Said spacing is necessary in order to convey the product strips onward subsequently in an ordered manner at regular spacings from one another and, for example, to supply them to a packaging station downstream. For this purpose, the star-shaped conveying device operates, as a rule, at a fixed rotational or conveying speed which is predefined, by the speed and pulse of the following conveying devices (so-called machine speed) or is synchronized with the same.

Chewing gum packaging machines, and consequently also the strip separating devices included therein, operate at high speeds, wherein today, for example, outputs of approximately 4000 articles (product strips) per minute are the target. In spite of said high outputs, gentle treatment of the products (sticks of chewing gum) should be ensured, this means that abrasion and damage to the products has to be reduced or prevented. In addition, the machines are to be capable of processing products (chewing gums) of different materials or with different material characteristics (texture), for example different degrees of hardness. Thus, for example, it can be desirable to process varieties of chewing gums with a softer material characteristic, this means a lower degree of hardness. In this connection, the sticks of chewing gum can consist, for example, of several layers which have different degrees of hardness. Common here, for example, is a stick of chewing gum consisting of three layers, where between a top and bottom layer produced from a chewing gum material, a layer with another material characteristic or consistency is arranged, for example a softer filling for an additional flavor.

On account of their low level of hardness and less dimensional stability connected thereto, these types of products potentially place higher demands on the mechanical conveying devices. The conveying and packaging machines have consequently to be capable of processing such types of products at a high machine output but with gentle product treatment. In this case, a high level of process reliability must be ensured, this means problems when convoying the products through the machine (for example predict bottlenecks, obstructions, blockages, etc.) must be avoided in order to carry out the desired high machine output. Finally, the products must not be damaged when being conveyed.

In the case of certain chewing gum materials and structures, in particular those with softer characteristics, that means a lower degree of hardness, the problem that can arise is that the product strip which is formed from the supplied sheets in the region of the separating devices, is not at the desired, predetermined spacing to the preceding product strip at the outlet of the separating devices, this means, for example, in the region of the star-shaped conveying device (separating star) following the conveying roller pairs. At the outlet of the separating devices, the relevant product strip can be, for example, in a position which does not correspond to a required position which is necessary so that the relevant product strip is transferred in a correct and positionally precise manner from the separating star to the following conveying device. Said following conveying device typically comprises entrainment means for the product strips which are arranged one behind another at fixed identical spacings in the conveying direction. The product strip formed and discharged by the separating devices must therefore be transferred in a positionally precise manner to the entrainment means provided next in each case of the following conveying device. If said positionally precise provision and supplying of the product strip is not ensured, there is the risk of, for example, the star-shaped conveying device (separating star) of the separating devices and/or the relevant entrainment means of the following conveying device grasping the relevant product strip in the wrong manner or not grasping it at all, as a result of which said product strip is not conveyed onward in the correct manner and can potentially be damaged.

On account of a faulty position of this type and corresponding faulty conveying and transferring of the product strip, problems can arise in said machine regions, for example product bottlenecks and blockages in the conveying section which potentially bring about a shutdown of the entire machine and result in damage, on the one hand, to the product strip and, on the other hand, also to the affected machine components.

In addition, in the case of the known chewing gum packaging machines and the strip separating devices included therein, the problem that can occur is that the sheets, from which the individual strips are to be formed in the separating devices, are not supplied to the separating devices in a gap-free manner lying one on top of another, this means that there is a spacing or a gap between a first sheet supplied to the separating devices and a following next sheet, as has been explained above. These types of gaps between the consecutive sheets can cause the individual strips to be able to be formed incorrectly in the separating devices, or they can also contribute to the fact that the individual strips formed in the separating devices are not taken over by the star-shaped conveying devices and transferred to the following entrainment conveying devices in the correct position. This means that potentially once again the spacing between the consecutive individual strips at the outlet of the separating devices does not correspond to the predetermined spacing which, corresponding to the separation of the entrainment means at the following conveying device, is necessary when transferring the individual strips and has to be maintained for fault-free transferring and conveying.

The problem of a gap existing between two consecutive sheets when they are conveyed and supplied to the separating devices, can occur once again in the case of certain chewing gum materials and structures, for example such with softer characteristics, that is to say a lower degree of hardness.

Proceeding from the above-described prior art and the named disadvantages and problems, the object underlying the invention is to create a device and a method for producing individual strip-shaped objects, in particular sticks of chewing gum, said device and method operating with greater process reliability and consequently enabling a greater machine output. In particular, a method and a device for producing individual product strips are to be created where the formed individual strips are prevented from having a wrong position at the output of the strip producing device, in particular a position which does not match a predetermined spacing between the individual consecutive product strips for the onward conveying thereof. As a result, finally, the possibility of processing products with different material characteristics and/or structures is to be improved, thus, for example, chewing gum products with a softer material characteristic and/or a multi-layered configuration. In this case, said products are to be treated gently and not damaged.

Said object is achieved according to the invention by a method and a device for producing individual strip-shaped objects, in particular objects that are suitable for consumption, in particular sticks of chewing gum, said method and device having the following method steps and features: supplying substantially rectangular sheets, from which the strip-shaped objects are to be formed, wherein the length of the shorter sides of the sheets corresponds substantially to the length of a strip-shaped object to be formed, and wherein several grooves which extend parallel to one another are arranged at identical spacings in the sheets substantially parallel to the shorter sides of the sheets, wherein the spacing between two grooves arranged side by side in each case corresponds substantially to the width of a strip-shaped object to be formed; and forming individual strip-shaped objects from the sheets which are supplied individually consecutively in their longitudinal direction. In this case, the step of forming the individual strip-shaped objects includes in particular the following method steps and features: separating in each case an individual strip-shaped object from the sheet at its front end in the conveying direction in each case along the frontmost groove; forming a predetermined spacing between the individual consecutive separated strip-shaped objects in the conveying direction at the outlet of the strip producing device for subsequently conveying the formed strip-shaped objects onward; detecting an actual position of each individual separated strip-shaped object in the conveying direction during the separation of the strip-shaped objects from the sheet or in the region of the separating devices; and correcting the position of the individual separated strip-shaped objects in the conveying direction if the detected actual position of the strip-shaped object does not correspond to a position which matches the predetermined spacing between the individual consecutive strip-shaped objects at the outlet of the strip producing device for a subsequent onward conveying of the formed strip-shaped objects.

According to the invention, an adjusting section or an adjusting circuit is created where initially the actual position of the individual formed product strip is determined in the strip producing device, and where the position of the product strip is then corrected into a predetermined required position if the determined actual position does not correspond to the required position. In this case, the required position is defined by the predetermined spacing which must be present at the outlet of the strip producing device between the individual consecutive product strips so that they are able to be taken over and conveyed onward in a correct and positionally precise manner by a following conveying device.

In a preferred embodiment of the invention, it is provided that the individual conveying devices or groups of conveying devices in the strip producing device in each case comprise own driving devices which are individually adjustable, and that sensor devices for detecting the actual position of each individual separated strip-shaped object in the conveying direction are arranged in the region of the conveying devices. In this case, the sensor devices interact in such a manner with the individual driving devices that the driving devices are controlled or adjusted in such a manner that the position of the individual separated strip-shaped objects in the conveying direction is corrected if the detected actual position of the strip-shaped object does not correspond to a position which matches the predetermined spacing between the individual consecutive strip-shaped objects at the outlet of the strip producing device.

In a further preferred embodiment of the invention, it is provided that conveying devices, which convey the individual sheets one after another in their longitudinal direction in such a manner that each sheet follows the preceding sheet in each case in a substantially positionally precise, gap-free manner and preferably without any dynamic pressure, are provided in the region of the supplying of the rectangular sheets to the region of the forming of the individual strip-shaped objects from the sheets. For this purpose, the following further method steps and features are provided in the region of the supplying of the sheets: detecting an actual position of each sheet in the conveying direction in the region of the supplying conveying devices; and correcting the position of the individual sheets in the conveying direction if the detected actual position of the sheet does not correspond to a predetermined position in such a manner that the consecutive sheets are supplied substantially without gaps between them to the following region of the forming of the individual strip-shaped objects.

Consequently, in the case of said embodiment, an adjusting section or adjusting circuit is also provided in the region of the supplying of the sheets, where the conveying devices of the sheet supplying means once again comprise individually adjustable driving means, and where, once again, sensor devices for detecting the actual position of the individual sheets in the conveying direction are arranged in the region of the conveying devices. In this case, the sensor devices interact in such a manner with the driving devices that the driving devices are controlled or adjusted in such a manner that the position of the individual sheets in the conveying direction is corrected such that no gaps exist between the consecutive sheets if the detected actual position of a sheet does not correspond to the predetermined position.

As a result of the method according to the invention and the device according to the invention, it is ensured that the individual product strips are formed, conveyed onward and transferred to the following conveying devices in a correct and positionally precise manner. As a result, a greater degree of process reliability is obtained than, in the case of the machines of the prior art as damage to the product strips and/or product bottlenecks in the conveying section are avoided. Consequently, using the method according to the invention and the device according to the invention, products, in particular sticks of chewing gum, with low degrees of material hardness can also be processed. Finally, all in all the greater process reliability achieved as a result ensures a higher machine output than in the prior art.

Further details and advantages of the invention are produced from the following detailed description of an embodiment in conjunction with the accompanying drawings.

Figure 1:
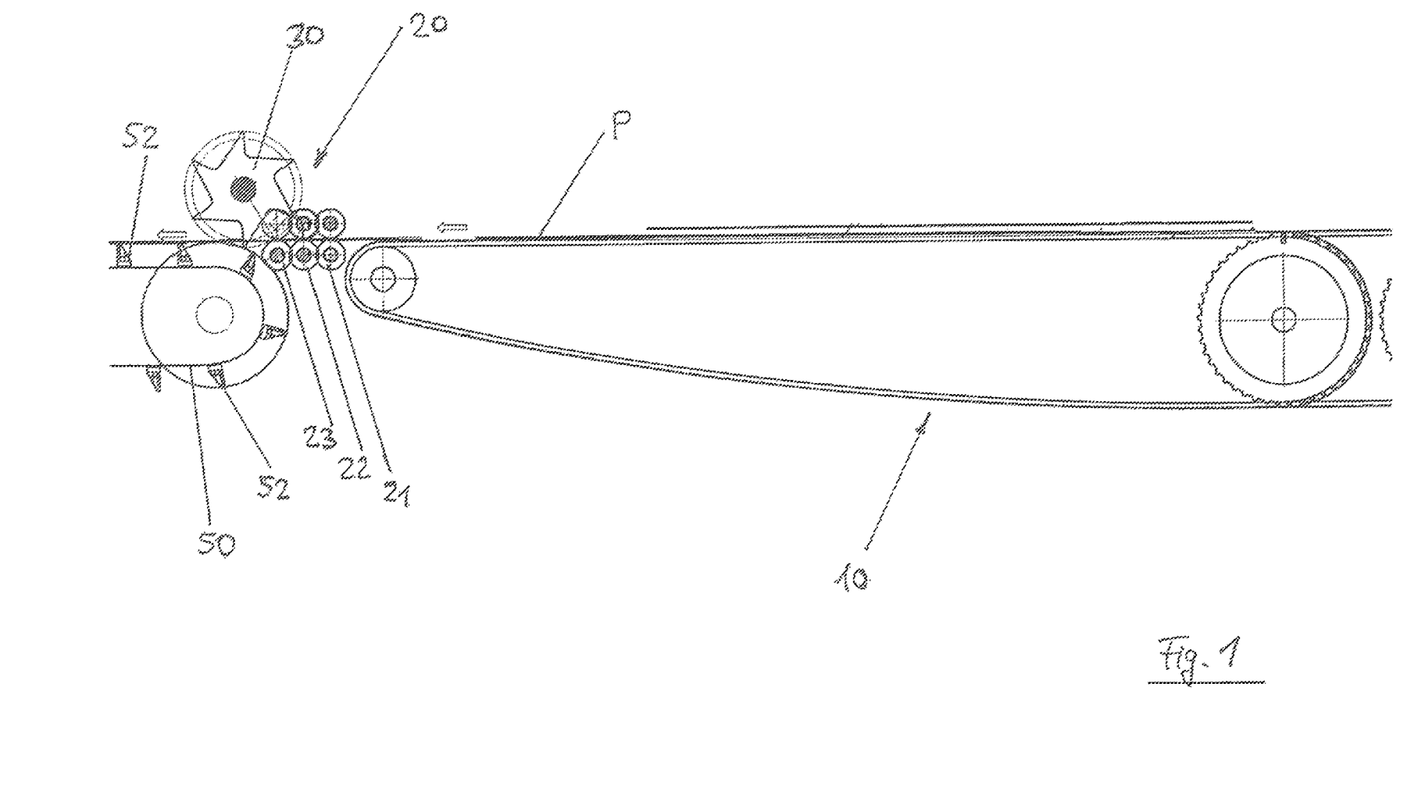
FIG. 1 shows a schematic side view of the strip producing device according to the invention.
Figure 2:
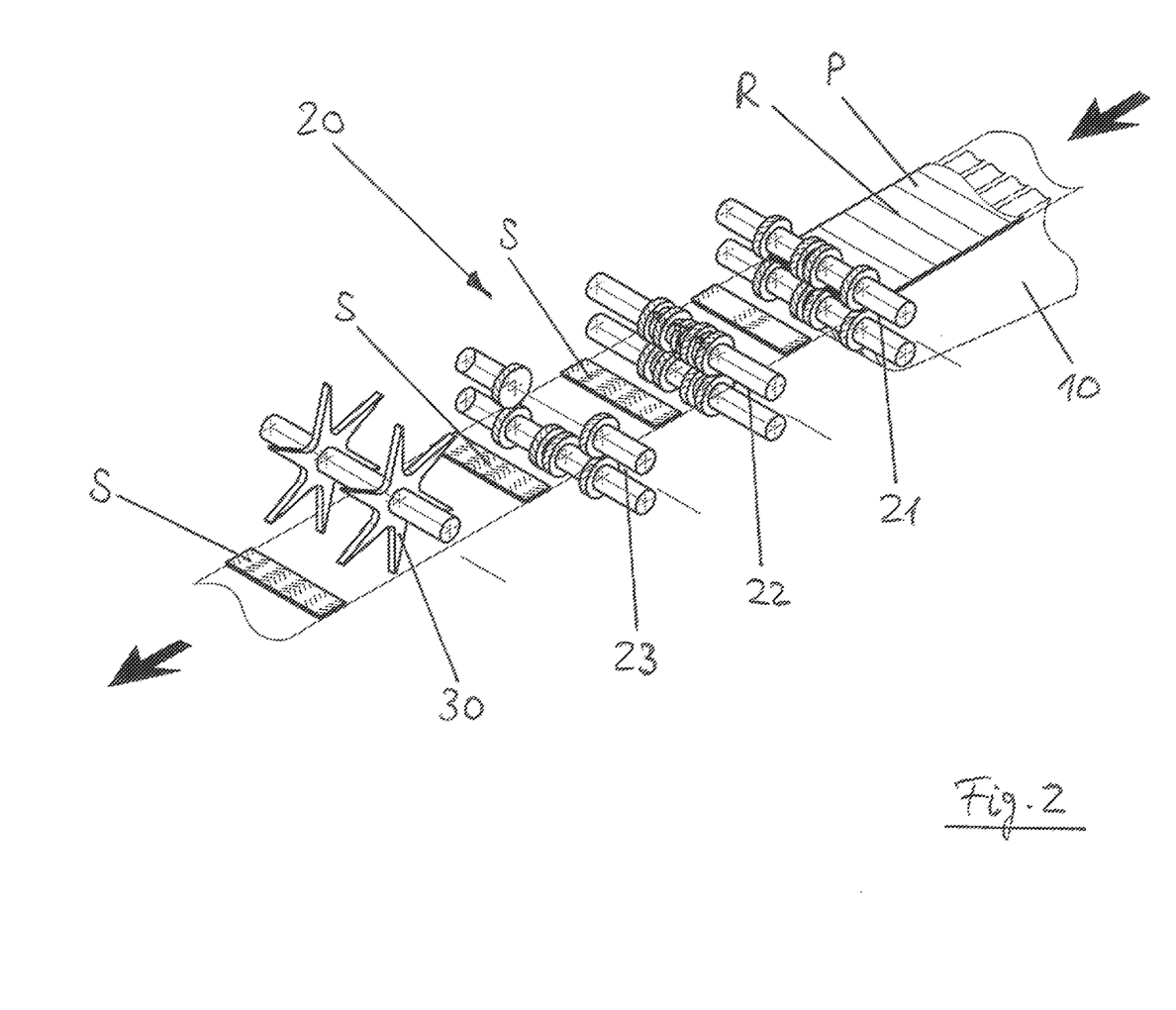
FIG. 2 shows an enlarged, perspective, exploded view of the separating devices of the strip producing device according to the invention.
Figure 3:
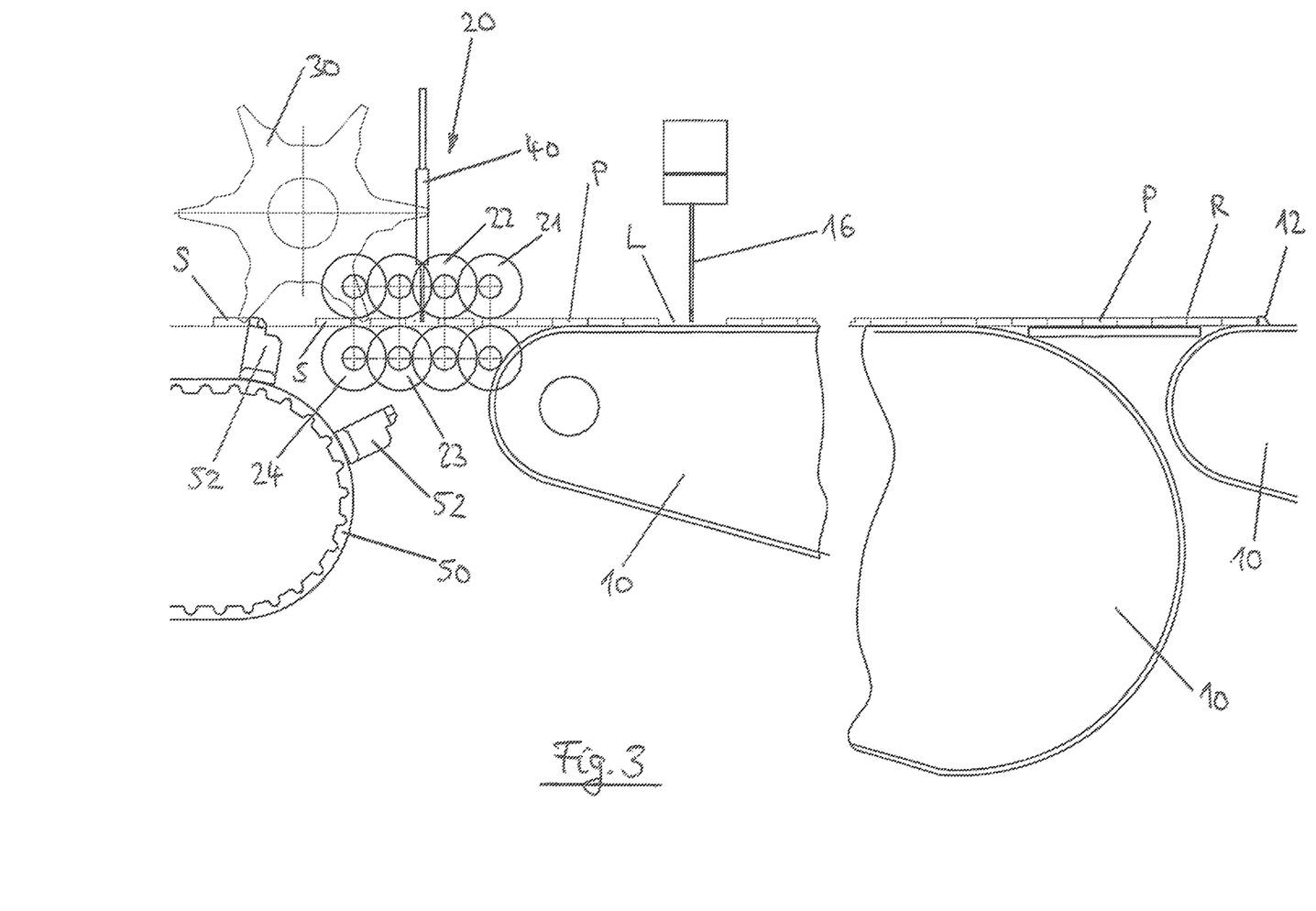
FIG. 3 shows an enlarged side view of a preferred embodiment of the strip producing device according to the invention.

In the representations in FIGS. 1 to 3, the product runs through the machine from right to left, a sheet P being provided and supplied on sheet conveying devices (sheet providing and supplying devices) 10 in each case at the right-hand end of said conveying section. The individual product strips S, in particular sticks of chewing gum, are formed from the sheet P in a following separating device 20. At the left-hand end of said conveying section, the formed individual product strips S are discharged to a following conveying device 50 for onward conveying and further processing. It is obvious that depending on the application and realization of the machine, a product flow from right to left is also possible.

FIGS. 1 to 3 show on their right-hand side in each case the sheet providing and supplying devices 10. Said conveying devices are typically belt or chain transporting devices which, as an option, can have entrainment means 12 which grasp the sheets P to be conveyed. The rectangular sheets P lie flat, as a rule individually, on the conveying devices 10 and are moved forwards by said conveying devices in their longitudinal direction, that is to say to the left in the figures.

The rectangular sheets P comprise grooves R which extend parallel to their short sides and parallel to one another and are arranged at identical spacings from one another. The spacing between in each case two adjacent grooves R corresponds substantially to the width of a product strip to be formed S. The grooves R consequently extend perpendicular to the conveying direction of the sheet P (see for example FIG. 2). The forming of said grooves R in the sheet P and the providing of the sheet P on the sheet conveying devices 10 is described in detail in the patent application by the applicant mentioned in the introduction.

The sheets P are preferably arranged and conveyed on the sheet conveying devices 10 in such a manner that the individual sheets P follow the preceding sheet P in each case in a positive locking and positionally precise manner and in particular without any gaps. The sheets P preferably also lie one behind another in a gap-free manner without any dynamic pressure, that is to say the sheet P following in each case preferably does not press from behind against the sheet P preceding in each case. For the case where there should be gaps L, however, between two consecutive sheets in said region, devices are provided by means of which said gaps L can be closed, as is described further below in detail.

The separating devices 20 for forming the individual strip-shaped objects S from the sheets P follow the sheet supplying devices 10. The separating devices 20, in this case, include in particular devices for separating in each case one single product strip S from the supplied sheet P at its front end in the conveying direction as a result of tearing or breaking along the frontmost groove R in each case in the sheet P in such a manner that the supplied sheet P and the separated strip S are situated substantially in the same plane. The separating devices 20 additionally include devices for onwardly conveying and accelerating the separated strip S in the conveying direction for forming a predefined spacing between the individual consecutive strips S as the outlet of the separating devices 20.

In the representations in FIGS. 1 and 2, the separating devices 20 include three rotatable roller pairs 21, 22, 23, which are arranged parallel to one another, are arranged one behind another in the conveying direction and engage with one another in a suitable manner. In the embodiment shown in FIG. 3, four such roller pairs 21, 22, 23, 24, which are arranged parallel to one another, are arranged one behind another in the conveying direction. The definitive number of roller pairs depends on the respective application. Each of the roller pairs grasps the supplied sheet P or the product strip S formed therefrom and conveys it onward by each roller pair receiving the product between its two rollers which rotate in opposite directions. As can be seen from the drawings, in the case of each roller pair one roller is arranged above and the other roller below the conveying plane.

To make said conditions clear, FIG. 2 shows an exploded view of the separating devices 20 and in particular of the arrangements of the roller pairs 21, 22, 23. In contrast, FIGS. 1 and 3 show the normal arrangement of said components inside the machine. The spacing between the axes of the consecutive roller pairs in the conveying direction, in this case, must be dimensioned such that the strip S conveyed and released by one roller pair is able to be grasped and conveyed onward by the following, next roller pair.

The rotational speed or in particular the conveying speed of the consecutive roller pairs 21, 22 23, 24 increases in a substantial manner in the conveying direction. As FIGS. 2 and 3 show, the sheet P supplied by the sheet conveying devices 10 is grasped by the first roller pair 21. In this connection, it can be provided in particular that the conveying speed of the first roller pair 21 corresponds substantially to the speed of the supplying of the sheet P such that the sheet is taken over and removed from the sheet conveying devices 10 by the first roller pair 21 at a constant speed. The following second roller pair 22 is rotated at a greater speed compared to the first roller pair 21. The effect of this is that the rollers of the second roller pair 22 separate, in particular break or tear, a strip S at the front end of the sheet P along the front most groove R in each case, as the conveying speed of the products is increased by the second roller pair 22, that is to say the conveying of the product is accelerated.

The third roller pair 23 has once again a higher conveying or rotational speed compared to the previous second roller pair 22, whereby the strip S which runs as a result of the third roller pair 23 is accelerated further in the conveying direction. In a corresponding manner, the fourth roller pair 24 (FIG. 3) also has a higher conveying or rotational speed once again compared to the previous third roller pair 23, whereby the strip S is accelerated, further again. All in all, the spacing between the individual consecutive strips S is gradually enlarged in the conveying direction in this way when running through the roller pairs 21, 22, 23, 24.

In an alternative embodiment, the rotational or conveying speed of the first roller pair 21 can already be greater than the speed of the supplying of the sheet P to the first roller pair 21 via the sheet conveying devices 10. In this case, the product strip S is already separated from the sheet P along the frontmost groove R by the first roller pair 21.

As can be seen further in FIGS. 1 to 3, a star-shaped conveying device (separating star) 30 is arranged in the conveying direction behind the roller pairs 21, 22, 23, 24 in the separating devices 20. Said star-shaped conveying device 30 is rotated in this case about an axis which is arranged substantially parallel to the rotational axes of the preceding roller pairs. The rotational or conveying speed, of the separating star 30 is increased again in relation to the rotational or conveying speed of the preceding rollers. In this way, the separating star 30 accelerates the strip S again further in the conveying direction, as a result of which the spacing between the consecutive strips S is enlarged here once again. As has been explained in the introduction, in this connection in particular a predetermined spacing is formed between the consecutive strips S, which spacing corresponds to the separation, that is to say the spacing, between individual consecutive entrainment means 52 of a following conveying device 50, by way of which the strip S is conveyed onward to a next processing station (for example a product packaging station). Said following conveying device 50 is shown, for example, in FIGS. 1 and 3, in each case at the left-hand edge of the figure.

As can be seen here, the separating star 30 transfers the individually formed strips S to the following conveying device 50, which comprises entrainment means 52 for one strip S in each case at a fixed, predefined spacing. The separating star 30 transfers the strips S consequently at a speed and at a spacing from one another to the following conveying device 50, which speed or spacing, respectively, corresponds to the speed and the spacing of the individual entrainment means 52 of the conveying device 50. The conveying device 50 can once again be formed by suitable conveying means, for example belt or chain conveying devices with entrainment means 52 mounted thereon which grasp the product strips S and advance them onward.

As has been explained in the introduction, it can occur under certain conditions that at the outlet of the separating devices 20 the individual separated consecutive strips S have a real position (actual position) which does not correspond to a required position which matches the predetermined spacing between the individual consecutive strips S, which is conditional on the separation of the entrainment means 52 of the following conveying device 50. This can occur in the case of the known strip producing devices within the framework of chewing gum packaging machines, for example in such cases in which a chewing gum material that is softer than usually used previously is used. In such cases, the formed strip S can alter its position in the course of the conveying by the separating device 20 such that its actual place or position in the conveying direction no longer corresponds to the predetermined required position. This can then result, for example, in unwanted collisions between the conveying devices, in particular the separating star 30, and the sticks of chewing gum S by the separating star 30, as a result of the strip S being in a wrong position, not grasping the strip S correctly for correct onward conveying.

In order to avoid these types of positional, deviations of the strip S, sensor devices 40 are provided in the separating device 20 for detecting the actual position of each individual separated strip S in the conveying direction. As FIG. 3 shows, a sensor 40 of this type can be arranged in the region of the roller pairs 21, 22, 23, 24. For example, the sensor 40 can monitor and detect the position of the strip S between the second roller pair 22 and the third roller pair 23. The sensor 40 can also be realized such that it detects the actual spacing between two consecutive strips S. The sensor 40 can be formed, for example, from an optical sensor with optical waveguides, which can be advantageous on account of its smaller geometric dimensions and the limited space taken up in the region of the roller pairs.

The positional data determined by the sensor 40 is then used to correct the position of the strip S in the conveying direction if the detected actual position of a strip S does not correspond to the required position which corresponds to the predetermined spacing between the consecutive strips S at the outlet of the separating device 20. Said positional correction is effected by means of adjusting or controlling the drives of the roller pairs 21, 22, 23, 24. In particular, each roller pair 21, 22, 23, 24 comprises an own drive, for example in the form of an electric motor, in particular a highly dynamic, precisely controllable servomotor (not shown in the drawings). By means of said individual drives, the rotational or conveying speed of the individual roller pairs is consequently adjustable individually or in suitable groups.

For the desired correction of the position of the individual strips S in the case of a deviation in the actual position from the required position, the sensor devices 40 interact with the individual driving devices of the individual roller pairs such that the driving devices are adjusted in such a manner that the position of the individual strips S in the conveying direction is corrected to the required position, where applicable, in the individual case. For this purpose the drives are adjusted in particular such that the rotational speeds of the rollers are increased or reduced depending on the requirement.

In this way, the sensor devices 40, together with the driving devices of individual or of all or of suitable groups of the roller pairs 21, 22, 23, 24, form an adjusting circuit which synchronizes the position of the individual strips S with the conditions and in particular the conveying speed and the spacing ratios of the following conveying devices 50.

As has already been explained above, under certain conditions the case can occur where the rectangular sheets P are not supplied in a gap-free manner to the separating devices 20, that is to say a gap L is generated or is present in the region of the sheet conveying devices 10 between two consecutive sheets P. As has also been explained above, these types of gaps between the consecutive product sheets P can result in problems in the further sequence of the conveying and processing of the sheets and of the individual strips S formed therefrom. For said reason, sensor devices 16 can also be provided in the region of the sheet conveying devices 10, said sensor devices detecting an actual position of each sheet P in the conveying direction in the region of the sheet conveying devices 10 (cf. FIG. 3). The sensor 16 can also be realized such that it detects the actual spacing between two consecutive sheets P. For the case where, in this connection, a deviation is ascertained between the real position (actual position) of the sheet P and a required position of the sheet P in which the relevant sheet P follows the preceding sheet P without any gaps in line with requirements, a correction of the position of the relevant sheet P is also provided in the region of the sheet conveying devices 10.

For this purpose, the drive of the sheet conveying devices 10 is once again individually controllable or adjustable, for example by the drive being formed by an electric motor or servomotor (not shown in the drawings). The sensor devices 16 of the sheet conveying devices 10 then interact once again with the driving devices of the sheet conveying devices 10 such that the drives are adjusted in such a manner that an actual position of the sheet P which deviates from the required position is corrected such that it assumes the required position in which a gap L no longer exists between the two relevant consecutive sheets P.

Consequently, once again in this case the sensor devices 16 form with the drives of the sheet conveying devices 10 an adjusting circuit or an adjusting section which causes a gap L, which is possibly initially present on the sheet conveying devices 10 between two consecutive sheets P, to be closed. Depending on the requirement in the given individual case, the conveying speed of the sheet conveying devices 10 can be increased or reduced in this case by means of their drives. The achievement of said measures is that the consecutive sheets P follow one another in a positionally precise, gap-free manner and preferably without any dynamic pressure and are supplied to the separating devices 20 in this form.

LIST OF REFERENCES

Sheet
R Groove in sheet P
S Strip-shape object, strip
L Gap between sheets P
10 Sheet conveying devices, sheet providing and supplying devices
12 Entrainment means
16 Sensor 20 Separating devices
21 First roller pair
22 Second roller pair
23 Third roller pair
24 Fourth roller pair
30 Star-shaped conveying device, separating star
40 Sensor
50 Conveying devices
52 Entrainment means

The invention claimed is:

1. A method for producing individual strip-shaped objects said method having the following steps:
supplying rectangular sheets, from which the strip-shaped objects are to be formed, each rectangular sheet having a length and a width shorter than the length of the rectangular sheet, and each strip-shaped object having a length and a width shorter than the length of the strip-shaped object, wherein the width of the sheets corresponds to the length of the strip-shaped object to be formed, and wherein several grooves which extend parallel to one another are arranged at identical spacings in each sheet parallel to the width of the sheets, wherein the spacing between two grooves arranged side by side in each case corresponds to the width of the strip-shaped object to be formed; and
forming individual strip-shaped objects from the sheets which are supplied individually following one after another in a conveying direction; characterized in that the step of forming the individual strip-shaped objects includes the following steps:
separating each individual strip-shaped object from the sheet in each case at a front end in the conveying direction along a frontmost groove;
forming a predetermined spacing between consecutive separated strip-shaped objects in the conveying direction for a subsequent onward conveying of the separated strip-shaped objects;
detecting an actual position of each individual separated strip-shaped object in the conveying direction during the separation of the strip-shaped objects from the sheet; and
correcting the actual position of the individual separated strip-shaped objects in the conveying direction by adjustable driving devices if the detected actual position of the strip-shaped object does not correspond to a position which matches the predetermined spacing between consecutive strip-shaped objects for the subsequent onward conveying of the separated strip-shaped objects;
wherein the step of separating each individual strip-shaped object from the sheet utilizes a plurality of conveying devices consecutively arranged, wherein a first conveying device in the conveying direction grasps the consecutive sheets and conveys them onward, and wherein subsequent conveying devices following in the conveying direction separate the individual strip-shaped objects and convey them onward, wherein conveying speeds of one or more of the consecutive conveying devices are controlled in such a manner individually that the individual separated, consecutive, strip-shaped objects are at the predetermined spacing from one another in the conveying direction at the subsequent onward conveying of the separated strip-shaped objects;
wherein the step of separating each individual strip-shaped object from the sheet utilizes roller pairs in each of the plurality of conveying devices wherein each roller pair is arranged parallel to one another and the pairs are arranged consecutively one behind another in the conveying direction wherein the conveying speed of the consecutive roller pairs substantially increases in the conveying direction, wherein a first roller pair in the conveying direction grasps the supplied sheet between them, and wherein following roller pairs separate the strip-shaped objects from the sheet;
wherein the step of detecting the actual position of each individual separated strip-shaped object in the conveying direction during the separation of the strip-shaped objects from the sheet utilizes a sensor that detects the actual position of each individual separated strip-shaped object in the conveying direction arranged in between the region of the conveying devices, wherein the sensor interacts in such a manner with the adjustable driving devices that the driving devices are adjusted in such a manner that the position of the individual separated strip-shaped objects in the conveying direction is corrected if the detected actual position of the strip-shaped object does not correspond to the position which matches the predetermined spacing between the individual consecutive strip-shaped objects;
wherein each roller pair utilizes an individually adjustable driving device, and in that the sensor for detecting the actual position of each individual separated strip-shaped object is arranged downstream of the first roller pair to detect separation.

2. The method as claimed in claim 1 wherein the individual strip-shaped objects are suitable for consumption.

3. The method as claimed in claim 1, characterized in that the step of supplying the sheets to the step of forming the individual strip-shaped objects out of the sheets comprises conveying the individual sheets one after another in their longitudinal direction in such a manner that each sheet follows the respective preceding sheet in a manner that is positionally precise, without dynamic pressure.

4. The method as claimed in claim 3, characterized in that the step of supplying the sheets comprises the following further steps:
detecting an actual position of each sheet in the conveying direction by sensors; and
correcting the actual position of the individual sheets by adjustable driving devices in the conveying direction if the detected actual position of the sheet does not correspond to a predetermined position.

5. A device for producing individual strip-shaped objects, said device comprising:
a supplying device for supplying rectangular sheets, from which the strip-shaped objects are to be formed, wherein each rectangular sheet comprises a length and a width shorter than the length of the rectangular sheet, wherein each strip-shaped object comprises a length and a width shorter than the length of the strip-shaped object, wherein the width of the sheets corresponds to the length of the strip-shaped object to be formed, and wherein a plurality of grooves which extend parallel to one another are arranged at identical spacings in the sheets parallel to the width of the sheets, wherein the spacing between two grooves arranged side by side in each case corresponds to the width of one strip-shaped object to be formed; and
a separating device for forming the individual strip-shaped objects out of the sheets which are supplied individually and consecutively in a conveying direction, the separating device comprising:
a first device for separating each individual strip-shaped object from the sheet at a front end in the conveying direction along a frontmost groove;

a second device for forming a predetermined spacing between the individual consecutive separated strip-shaped objects in the conveying direction at an outlet of a strip producing device;

a sensor device for detecting an actual position of each individual separated strip-shaped object in the conveying direction in a region of the first device; and adjustable driving devices for correcting the actual position of the individual separated strip-shaped objects in the conveying direction if the detected actual position of the strip-shaped object does not correspond to a position which matches the predetermined spacing between the individual consecutive strip-shaped objects at the outlet of the strip producing device;

wherein the first device comprises a plurality of conveying devices consecutively arranged, wherein a first conveying device in the conveying direction grasps the consecutive sheets and conveys them onward, and wherein subsequent conveying devices following in the conveying direction separate the individual strip-shaped objects from the sheets and grasp the separated individual strip-shaped objects and convey them onward, wherein conveying speeds of one or more of the consecutive conveying devices are controllable in such a manner individually that the individual separated, consecutive, strip-shaped objects are at the predetermined spacing from one another in the conveying direction at the outlet of the strip producing device;

characterized in that each conveying device comprises roller pairs wherein each roller pair is arranged parallel to one another and the pairs are arranged consecutively one behind another in the conveying direction, wherein the conveying speed of the consecutive roller pairs substantially increases in the conveying direction, wherein a first roller pair in the conveying direction grasps the supplied sheet between them, and wherein following roller pairs separate the strip-shaped object from the sheet;

further comprising the sensor device for detecting the actual position of each individual separated strip-shaped object in the conveying direction arranged in between the region of the conveying devices, wherein the sensor device interacts in such a manner with the adjustable driving devices that the driving devices are adjusted in such a manner that the position of the individual separated strip-shaped objects in the conveying direction is corrected if the detected actual position of the strip-shaped object does not correspond to the position which matches the predetermined spacing between the individual consecutive strip-shaped objects at the outlet of the strip producing device;

characterized in that each roller pair comprises an individually adjustable driving device, and in that the sensor device for detecting the actual position of each individual separated strip-shaped object is arranged downstream of the first roller pair to detect separation.

6. The device as claimed in claim 5, wherein the supplying device supplies the individual sheets in the conveying direction one after another to the separating device for forming the individual strip-shaped objects in such a manner that each sheet follows the respective preceding sheet in a positionally precise manner without any dynamic pressure.

7. The device as claimed in claim 6, characterized in that the supplying device comprises a transporting device selected from the group consisting of a belt transporting device, a chain transporting device, and an entrainment transporting device.

8. The device as claimed in claim 6, characterized in that the supplying device comprises:

devices for detecting an actual position of each sheet in the conveying direction downstream or in between the region of the supplying device; and adjustable driving devices for correcting the position of the individual sheets in the conveying direction if the detected actual position of the sheet does not correspond to a predetermined position in such a manner that the consecutive sheets are supplied to the separating device for forming the individual strip-shaped objects.

9. The device as claimed in claim 8, characterized in that sensor devices for detecting the actual position of the individual sheets in the conveying direction are arranged downstream or in between the region of the supplying device.

10. The device as claimed in claim 5, characterized in that the separating device comprises a star-shaped conveying device which is arranged behind the roller pairs in the conveying direction, wherein the star-shaped conveying device rotates about an axis which is arranged parallel to rotational axes of the roller pairs, and wherein the star-shaped conveying device grasps the separated strip-shaped object and conveys it onward in the conveying direction.

11. The device as claimed in claim 5 wherein the individual strip-shaped objects are suitable for consumption.

12. The device as claimed in claim 5, characterized in that the conveying speed of the first roller pair in the conveying direction corresponds to a speed of supplying of the sheet, and in that the predetermined spacing between the individual consecutive strip-shaped objects at the outlet of the strip producing device corresponds to a spacing between individual consecutive entrainment devices which take over the individual strip-shaped objects following the strip producing device and convey them onward.

13. The device as claimed in claim 5, characterized in that four roller pairs are arranged one behind the other in the conveying direction.

14. A device for producing individual strip-shaped objects comprising:

a supplying device for supplying rectangular sheets, from which the strip-shaped objects are to be formed, wherein each rectangular sheet comprises a length and a width shorter than the length of the rectangular sheet, wherein each strip-shaped object comprises a length and a width shorter than the length of the strip-shaped object, wherein the width of the sheets corresponds to the length of the strip-shaped object to be formed, and wherein a plurality of grooves which extend parallel to one another are arranged at identical spacings in the sheets parallel to the width of the sheets, wherein the spacing between two grooves arranged side by side in each case corresponds to the width of one strip-shaped object to be formed, the supplying device comprising:

a transporting device selected from the group consisting of a belt transporting device, a chain transporting device, and an entrainment transporting device;

sheet sensor devices for detecting an actual position of the individual sheets in a conveying direction in a region of the supplying device; and individually adjustable driving devices downstream or in between the region of the supplying device for correcting the actual position of the individual rectangular sheets in the conveying direction if the actual position of the individual rectangular sheets that is detected by the sheet sensor devices does not correspond to a predetermined position in such a manner that consecutive sheets are supplied without gaps between them without any dynamic pressure to a separating device for forming the individual strip-shaped objects, the separating device for forming the individual strip-shaped objects out of the sheets that are supplied individually and consecutively in the conveying direction, the separating device comprising:

a first roller pair in the conveying direction that grasps each sheet and conveys the sheet onward;

a second roller pair and a third roller pair following in the conveying direction that separate the individual strip-shaped objects from each sheet at a front end in the conveying direction along a frontmost groove and grasp each separated individual strip-shaped object and convey it onward;

a star-shaped conveying device, arranged behind the first, second, and third roller pairs in the conveying direction and rotates about an axis arranged parallel to rotational axes of the roller pairs, that grasps each separated strip-shaped object and conveys it onward in the conveying direction, wherein the first, second, and third roller pairs and the star-shaped conveying device are arranged parallel to one another and consecutively one behind another in the conveying direction; and a strip sensor device for detecting an actual position of each individual separated strip-shaped object arranged in the roller pairs' region, wherein the strip sensor device for detecting the actual position of each individual separated strip-shaped object interacts with each corresponding adjustable driving device such that each corresponding adjustable driving device is adjusted in such a manner that the actual position of each individual separated strip-shaped object in the conveying direction is corrected if the actual position of the strip-shaped object detected does not correspond to a position which matches a predetermined spacing between the individual consecutive strip-shaped objects at an outlet of the device for producing individual strip-shaped objects, wherein conveying speeds of the roller pairs are controllable in such a manner individually that the consecutive strip-shaped objects that have been separated are at the predetermined spacing from one another in the conveying direction at the outlet of the device for producing individual strip-shaped objects, wherein the conveying speed of each roller pair increases in the conveying direction allowing the first roller pair in the conveying direction to grasp the rectangular sheet and the second and third roller pairs to separate each strip-shaped object from the sheet, and wherein the first roller pair's conveying speed in the conveying direction corresponds to a speed of supplying the rectangular sheet, and in that the predetermined spacing between the individual consecutive strip-shaped objects at the outlet of the device for producing individual strip-shaped objects corresponds to a spacing between individual consecutive entrainment devices that take over the individual strip-shaped objects following the device for producing individual strip-shaped objects and convey them onward.

\* \* \* \* \*